US008601348B2

(12) United States Patent
Hafner et al.

(10) Patent No.: US 8,601,348 B2
(45) Date of Patent: Dec. 3, 2013

(54) ERROR CHECKING ADDRESSABLE BLOCKS IN STORAGE

(71) Applicant: International Business Machines Corporation, Armonk, NY (US)

(72) Inventors: James L. Hafner, San Jose, CA (US); David R. Kahler, Tucson, AZ (US); Robert A. Kubo, Escondido, CA (US); David F. Mannenbach, Tucson, AZ (US); Karl A. Nielsen, Tucson, AZ (US); James A. O'Connor, Poughkeepsie, NY (US); Richard B. Stelmach, Tucson, AZ (US); Krishnakumar R. Surugucchi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/742,338

(22) Filed: Jan. 15, 2013

(65) Prior Publication Data

US 2013/0132801 A1   May 23, 2013

Related U.S. Application Data

(63) Continuation of application No. 11/734,786, filed on Apr. 12, 2007, now Pat. No. 8,370,715.

(51) Int. Cl.
*G11C 29/00* (2006.01)
(52) U.S. Cl.
USPC .......................................... 714/770; 714/769
(58) Field of Classification Search
USPC .................................. 714/769, 770
See application file for complete search history.

(56) References Cited

U.S. PATENT DOCUMENTS 4,672,483 A * 6/1987 Kawada ........................ 360/51
4,888,773 A * 12/1989 Arlington et al. ............. 714/764
(Continued)

FOREIGN PATENT DOCUMENTS

EP   0814398   12/2000

OTHER PUBLICATIONS

First Office Action dated Feb. 8, 2011, pp. 1-16, for U.S. Appl. No. 11/734,786, filed Apr. 12, 2007, by inventors J.L. Hafner, et al. (18.208).

(Continued)

*Primary Examiner* — Joseph D Torres
(74) *Attorney, Agent, or Firm* — David W. Victor; Konrad Raynes Davda & Victor LLP

(57) ABSTRACT

Provided are a method, system, and article of manufacture for error checking addressable blocks in storage. Addressable blocks of data are stored in a storage in stripes, wherein each stripe includes a plurality of data blocks for one of the addressable blocks and at least one checksum block including checksum data for the addressable block. A write request is received to modify data in one of the addressable blocks. The write and updating the checksum are performed in the stripe having the modified addressable block. An indication is made to perform an error checking operation on the stripe for the modified addressable block in response to the write request, wherein the error checking operation reads the data blocks and the checksum in the stripe to determine if the checksum data is accurate. An error handling operation is initiated in response to determining that the checksum data is not accurate.

18 Claims, 4 Drawing Sheets

(56) References Cited

U.S. PATENT DOCUMENTS

| | | | | |
|---|---|---|---|---|
| 5,088,081 | A | * | 2/1992 | Farr .................. 369/47.14 |
| 5,134,619 | A | * | 7/1992 | Henson et al. ............ 714/770 |
| 5,140,592 | A | * | 8/1992 | Idleman et al. ........... 714/5.11 |
| 5,195,100 | A | * | 3/1993 | Katz et al. .................. 714/22 |
| 5,208,813 | A | * | 5/1993 | Stallmo .................. 714/6.32 |
| 5,233,618 | A | * | 8/1993 | Glider et al. ............. 714/6.12 |
| 5,235,693 | A | * | 8/1993 | Chinnaswamy et al. ..... 711/159 |
| 5,243,699 | A | * | 9/1993 | Nickolls et al. ............. 712/11 |
| 5,271,012 | A | * | 12/1993 | Blaum et al. ............. 714/6.24 |
| 5,274,645 | A | * | 12/1993 | Idleman et al. ............ 714/6.1 |
| 5,325,375 | A | * | 6/1994 | Westberg .................. 714/805 |
| 5,341,381 | A | * | 8/1994 | Fuller ..................... 714/6.12 |
| 5,390,187 | A | * | 2/1995 | Stallmo .................. 714/6.32 |
| 5,390,327 | A | * | 2/1995 | Lubbers et al. ........... 714/6.32 |
| 5,398,253 | A | * | 3/1995 | Gordon .................... 714/766 |
| 5,469,453 | A | * | 11/1995 | Glider et al. ............. 714/6.12 |
| 5,475,697 | A | * | 12/1995 | Katz et al. ................. 711/159 |
| 5,483,641 | A | * | 1/1996 | Jones et al. ................... 710/3 |
| 5,485,571 | A | * | 1/1996 | Menon .................... 714/6.32 |
| 5,504,858 | A | * | 4/1996 | Ellis et al. ................ 714/6.24 |
| 5,526,507 | A | * | 6/1996 | Hill ......................... 711/114 |
| 5,530,948 | A | * | 6/1996 | Islam ...................... 714/6.12 |
| 5,530,960 | A | * | 6/1996 | Parks et al. ................. 710/5 |
| 5,602,667 | A | * | 2/1997 | Patel ....................... 398/141 |
| 5,608,891 | A | * | 3/1997 | Mizuno et al. ............ 711/114 |
| 5,619,723 | A | * | 4/1997 | Jones et al. ................... 710/3 |
| 5,720,025 | A | * | 2/1998 | Wilkes et al. ............ 714/6.12 |
| 5,737,744 | A | * | 4/1998 | Callison et al. ........... 711/114 |
| 5,740,465 | A | * | 4/1998 | Matsunami et al. .......... 710/5 |
| 5,742,752 | A | * | 4/1998 | DeKoning ............... 714/6.22 |
| 5,758,054 | A | * | 5/1998 | Katz et al. .................. 714/22 |
| 5,761,402 | A | * | 6/1998 | Kaneda et al. ............ 714/6.24 |
| 5,774,641 | A | * | 6/1998 | Islam et al. ............... 714/6.12 |
| 5,774,643 | A | * | 6/1998 | Lubbers et al. ............. 714/20 |
| 5,778,426 | A | * | 7/1998 | DeKoning et al. .......... 711/122 |
| 5,787,459 | A | * | 7/1998 | Stallmo et al. .............. 711/112 |
| 5,787,460 | A | | 7/1998 | Yashiro et al. |
| 5,819,109 | A | | 10/1998 | Davis |
| 5,867,732 | A | * | 2/1999 | Young ........................ 710/52 |
| 5,881,250 | A | * | 3/1999 | Young ....................... 710/306 |
| 5,884,098 | A | * | 3/1999 | Mason, Jr. .................. 710/52 |
| 5,896,493 | A | * | 4/1999 | Rao ........................ 714/6.12 |
| 5,958,067 | A | * | 9/1999 | Kaneda et al. .............. 714/6.1 |
| 5,960,169 | A | * | 9/1999 | Styczinski ............... 714/6.12 |
| 5,974,530 | A | * | 10/1999 | Young ......................... 712/43 |
| 5,974,544 | A | * | 10/1999 | Jeffries et al. ................. 713/1 |
| 5,991,861 | A | * | 11/1999 | Young ....................... 711/202 |
| 6,112,255 | A | * | 8/2000 | Dunn et al. ................... 710/7 |
| 6,138,125 | A | * | 10/2000 | DeMoss .............. 707/999.202 |
| 6,253,213 | B1 | | 6/2001 | Vanderschaaf |
| 6,289,398 | B1 | * | 9/2001 | Stallmo et al. ................ 710/5 |
| 6,301,432 | B2 | * | 10/2001 | Miyawaki et al. ........... 386/265 |
| 6,378,038 | B1 | * | 4/2002 | Richardson et al. .......... 711/114 |
| 6,567,891 | B2 | * | 5/2003 | Oldfield et al. .............. 711/114 |
| 6,578,126 | B1 | * | 6/2003 | MacLellan et al. .......... 711/167 |
| 6,687,872 | B2 | * | 2/2004 | Oldfield et al. .............. 714/801 |
| 6,725,321 | B1 | * | 4/2004 | Sinclair et al. .............. 711/103 |
| 6,751,757 | B2 | * | 6/2004 | Biskup et al. ................. 714/54 |
| 6,775,794 | B1 | * | 8/2004 | Horst et al. .................... 714/42 |
| 6,976,124 | B2 | * | 12/2005 | Morita et al. ................ 711/114 |
| 6,981,171 | B2 | * | 12/2005 | Hashemi ..................... 714/5.11 |
| 7,076,606 | B2 | * | 7/2006 | Orsley ........................ 711/114 |
| 7,111,227 | B2 | * | 9/2006 | Oldfield et al. .............. 714/801 |
| 7,174,476 | B2 | * | 2/2007 | Ashmore et al. ............ 714/5.11 |
| 7,315,976 | B2 | * | 1/2008 | Holt ............................ 714/769 |
| 7,386,758 | B2 | * | 6/2008 | Kitamura ................... 714/6.21 |
| 7,549,089 | B1 | * | 6/2009 | Kimmel et al. ................ 714/42 |
| 7,558,839 | B1 | * | 7/2009 | McGovern .................. 709/218 |
| 7,694,081 | B2 | * | 4/2010 | Shimada ..................... 711/146 |
| 7,822,921 | B2 | * | 10/2010 | Taylor ........................ 711/114 |
| 7,831,768 | B2 | * | 11/2010 | Ananthamurthy et al. ... 711/114 |
| 7,861,036 | B2 | * | 12/2010 | Byrne et al. ................. 711/114 |
| 2002/0059539 | A1 | * | 5/2002 | Anderson ......................... 714/6 |
| 2008/0256420 | A1 | | 10/2008 | Hafner et al. |

OTHER PUBLICATIONS

Response dated May 8, 2011, pp. 1-14 to First Office Action dated Feb. 8, 2011, pp. 1-16, for U.S. Appl. No. 11/734,786, filed Apr. 12, 2007 by inventors J.L. Hafner, et al. (18.208).

Final Office Action dated May 19, 2011, pp. 1-14, for U.S. Appl. No. 11/734,786 by inventors J.L. Hafner, et al. (18.208).

Response dated Aug. 16, 2011, pp. 1-10, to Final Office Action dated May 19, 2011, pp. 1-14, for U.S. Appl. No. 11/734,786, filed Apr. 12, 2007, by inventors J.L. Hafner, et al. (18.208).

RCE and Amendment dated Sep. 16, 2011, pp. 1-17 to Final Office Action dated May 19, 2011, pp. 1-14, for U.S. Appl. No. 11/734,786, filed Apr. 12, 2007. by inventors J.L. Hafner, et al. (18.208).

Notice of Allowance dated Sep. 26, 2012, pp. 1-5, for U.S. Appl. No. 11/734,786, filed Apr. 12, 2007, by inventors J.L. Hafner, et al. (18.208).

* cited by examiner

ERROR CHECKING ADDRESSABLE BLOCKS IN STORAGE

CROSS-REFERENCE TO RELATED APPLICATION

This application is a continuation of U.S. patent application Ser. No. 11/734,786, filed Apr. 12, 2007, which is incorporated herein by reference in its entirety.

BACKGROUND OF THE INVENTION

1. Field of the Invention

The present invention relates to a method, system, and article of manufacture for error checking addressable blocks in storage 2. Description of the Related Art In a Redundant Array of Independent Disks (RAID), a RAID controller stripes data for an addressable block, such as a logical block address (LBA), tracks, etc., to multiple disk drives, calculates checksum blocks for the data, and writes the checksum blocks to a separate disk. Data or checksum blocks written to each disk in a RAID rank are referred to as a stripe or stride, where a stripe comprises the consecutive sectors written to a single disk in the rank of storage devices across which data and checksum information are written. RAID schemes, such as RAID levels 1, 2, 3, 4, 5, 10 [0+1, 1+0], provide a single level of redundant protection and are tolerant of a single device failure prior to being exposed to data loss from an additional failure. Single error correction codes such as used in RAID3, RAID4 and RAID5 provide the capability to correct for an erasure when the location of the data error can be pinpointed by some independent means. For hard disk drives, the error may be pinpointed and corrected because the disk does not respond or other checkers (checksum, CRCs, LRCs, etc) on the disk make it easy to locate the source of the data error independent of the RAID checksum. RAID 6 provides an additional checksum block, or RAID checksum code, that can be used to pinpoint the location of and correct for a single symbol error or multiple failures, such as double disk failures. RAID 6 may utilize Reed-Solomon (R-S) codes comprised of symbols calculated from polynomials.

Online RAID array repair, generally known as hot sparing, restores RAID array redundancy following a failure of a storage device. During the online array repair the RAID array is in a rebuilding state and remains susceptible to additional failures resulting in an unrecoverable data loss. Recent increases in the storage capacity of storage devices has increased the statistical probability that data in a single storage array may experience data loss events (either from media errors or device failures).

RAID storage algorithms may operate at a controller level and are dependent on the correct operation of the storage devices to properly store the data written in the error correct location of the media. Storage devices have been observed to improperly report successful completion of a write operation. For instance, the storage device read/write head mechanism may not write the data for a data block in a stripe, resulting in a "dropped write". Additional, data may be written to a wrong location on the storage media, resulting in an "off track write". These errors create data integrity issues (data loss) that may result in incorrect data being returned to the requestor and in corruption of the checksum protection data, which can prevent the successful recovery of lost data.

To limit the exposure related to these types of errors, RAID controller error checking operations may run as background tasks to verify that the data and checksum blocks in the stripes are consistent within a data increment within an array. In the case of mirrored RAID schemes, the two copies of the data are read and compared to verify consistency. The earlier the detection of this condition the better the isolation and limiting of the propagation of the data integrity.

There is a need in the art for improved techniques for error correction in storage arrays.

SUMMARY

Provided are a method, system, and article of manufacture for error checking addressable blocks in storage. Addressable blocks of data are stored in a storage in stripes, wherein each stripe includes a plurality of data blocks for one of the addressable blocks and at least one checksum block including checksum data derived from the data blocks for the addressable block. A write request is received to modify data in one of the addressable blocks. The write and updating the checksum are performed in the stripe having the modified addressable block. An indication is made to perform an error checking operation on the stripe for the modified addressable block in response to the write request, wherein the error checking operation reads the data blocks and the checksum in the stripe to determine if the checksum data is accurate. An error handling operation is initiated in response to determining that the checksum data is not accurate.

DETAILED DESCRIPTION

Figure 1:
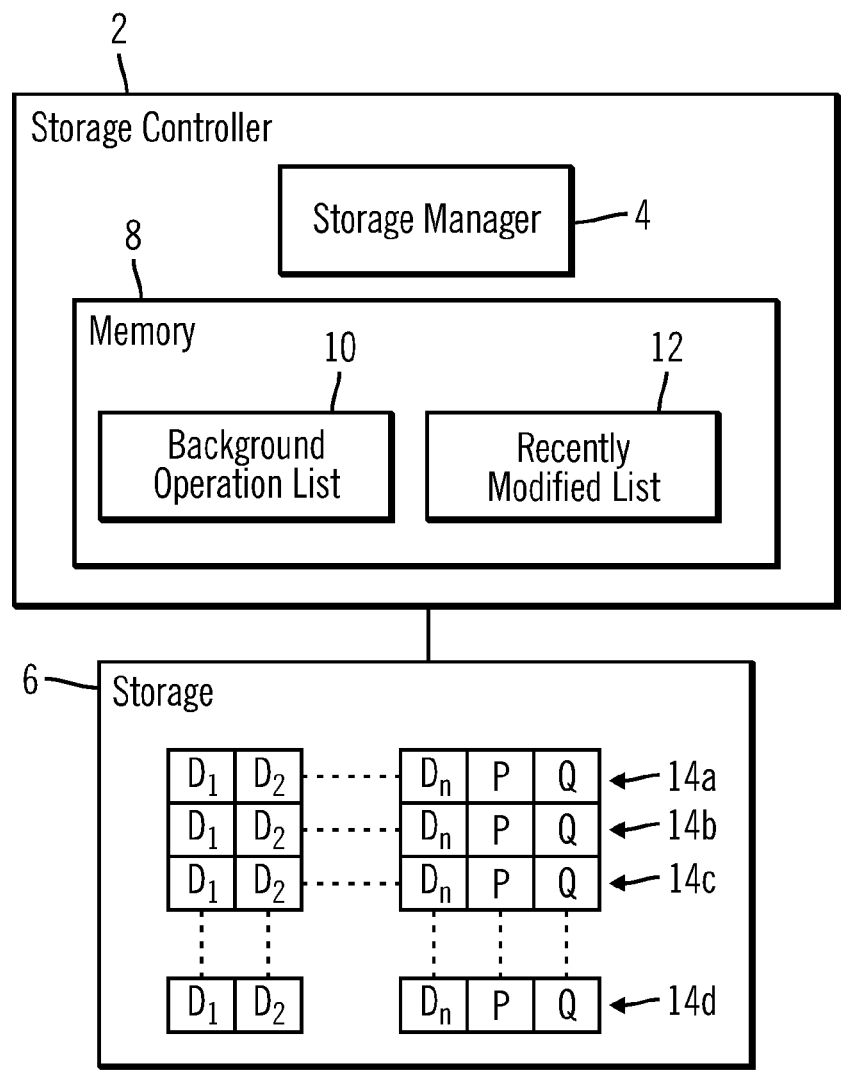
FIG. 1 illustrates an embodiment of a computing environment.

FIG. 1 illustrates an embodiment of a computing environment. A storage controller 2 includes a storage manager 4 comprising software and/or hardware to manage read and write requests to data in a storage 6. The storage manager 4 maintains information in a memory 8, including a background operation list 10 indicating all the active addressable blocks in the storage 6, such as tracks or logical block addresses (LBAs), and a recently modified list 12 indicating addressable blocks recently modified. The storage manager 4 may perform error checking on the addressable blocks indicated in the lists 10 and 12.

The storage 6 may comprise one or more storage devices, such as one or more disk drives, an array of storage devices, such as a Just a Bunch of Disks (JBOD), Direct Access Storage Device (DASD), Redundant Array of Independent Disks (RAID) array, virtualization device, tape storage, flash memory, etc. Data or checksum blocks written to each disk in a RAID rank for an addressable location, such as an LBA or track, are referred to as a stripe, where a stripe comprises the consecutive sectors written to a single disk in a rank of storage devices across which data and checksum information are written.

Data in each addressable block in the storage 6 is stored in a stripe 14a, 14b, 14c, 14d. Each stripe 14a, 14b, 14c, 14d comprises multiple data blocks, $D_1$, $D_2$, $D_3$, $D_n$, and at least two checksum blocks (P) and (Q), calculated using suitable error correction calculation techniques known in the art. For instance, the (P) checksum block may be calculated using a standard error checking checksum, such as shown in equation (1) below:

$$P=D_1+D_2+\ldots+D_n \quad (1)$$

The additional checksum block (Q) may be calculated using a polynomial RAID6 checksum, such as a Reed-Solomon code, such as shown in equation (2) below:

$$Q=D_1*x_n+D_2*x_2+\ldots+D_n*x_n \quad (2)$$

The checksum blocks (P) and (Q) block may comprise any suitable error correction code known in the art, such as a redundancy check code, cyclical redundancy check (CRC) code, parity code, or other checksum values known in the art. In alternative embodiments, only one checksum, e.g., just a (P) block, may be maintained for each stripe 14a, 14b, 14c, 14d, and thus the error correction operation would only use on checksum block.

In one embodiment, the data block $D_i$ in a stripe 14a, 14b, 14c, 14d is stored in a separate storage unit, e.g., a hard disk drive, such a that there are n storage units for storing data and one storage unit for storing checksum. Redundant Array of Independent Disk (RAID) algorithms known in the art may be used to write stripes 14a, 14b, 14c, 14d of data and checksum to the storage 6. In this way, the data from one addressable block, e.g., track, LBA, etc., is stored across multiple disks to enable data recovery in the event of a failure and increased data throughput to improve read and write performance.

The storage controller 2 may comprise a separate storage server in communication with multiple host systems, having one or more processors. Alternatively, the storage controller 2 may be implemented on an expansion card or the motherboard of a computer system. The combination of the storage controller 2 and storage manager 4 may be implemented as a processor executing computer readable code and/or a hardware device implementing hardware logic to perform the described operations.

Figure 2:
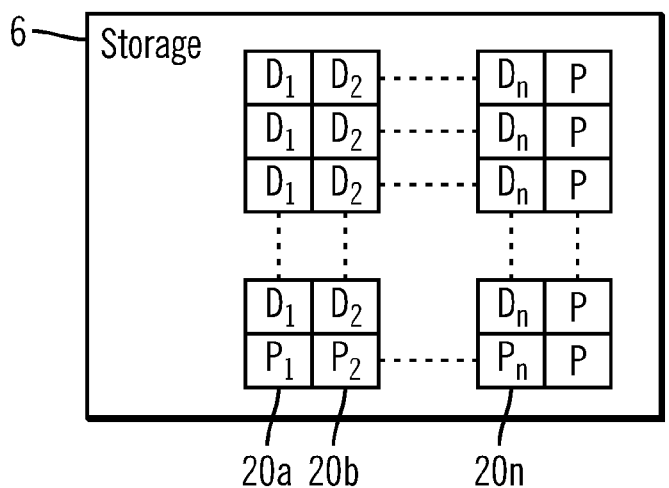
FIG. 2 illustrates an arrangement of user data and checksum data in storage.

FIG. 2 illustrates an alternative arrangement known of how data may be striped in the storage 6, where each stripe includes data and a horizontal checksum block (P), as described above with respect to FIG. 1, and additionally includes a vertical checksum element 20a, 20b, 20c, 20d to provide checksum in the vertical direction for blocks from different stripes on the same storage unit, e.g., checksum block $P_i$ provides checksum for all the $D_i$ blocks in the stripes. In the embodiment of FIG. 2, there may not be an additional horizontal checksum, such as (Q).

FIGS. 1 and 2 show different arrangements for data and checksum blocks in a stripe in a storage array. However, there are many different arrangements of the data and checksum blocks, such as interleaved, diagonal, etc., used by RAID algorithms in the art.

Figure 3:
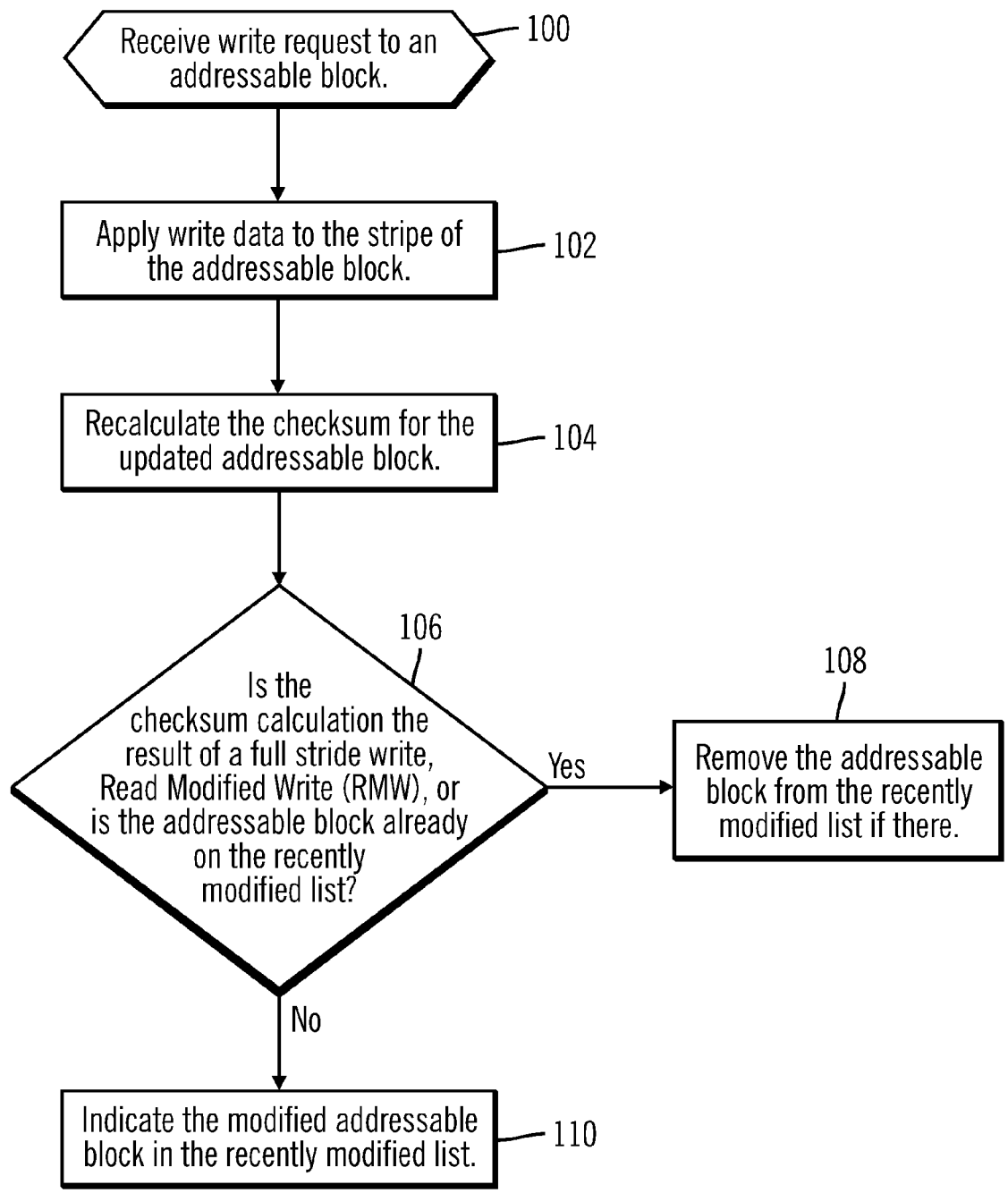
FIG. 3 illustrates an embodiment of operations to manage a recently modified list.

FIG. 3 illustrates an embodiment of operations performed by the storage manager 4 for a write request to an addressable block. Upon receiving (at block 100) a write request to an addressable block in the storage 6, the storage manager 4 applies (at block 102) the write data to the stripe 14a, 14b, 14c, 14d having the addressable block and recalculates (at block 104) the checksum for the updated addressable block. The checksum recalculation operation may recalculate only a single checksum in the horizontal direction, multiple checksums in the horizontal direction or a horizontal and vertical checksum, depending on the checksum implementation for the stripe. In certain embodiments, the storage manager 4 may store the updated addressable block and checksum in a cache (not shown) and destage at a later time. If (at block 106) the checksum calculation is based on a full stride write or a Read Modified Write (RMW), which means that the checksum was calculated from all the data blocks, or if the addressable block is already on the recently modified list 12, then the addressable block is removed (at block 108) from the recently modified list 12 if indicated on the list. In this way, an addressable block is removed from the list 12 if one or more checksums are recalculated using all the blocks during a write operation or as part of a background operation. Otherwise, if the checksum is calculated from a partial stripe or if the addressable block is not already indicated on the recently modified list 12, then the modified addressable block is indicated (at block 110) in the recently modified list 12. Additionally, the operations of blocks 104-110 may be performed when checking the checksum during a background operation per the processing of the background operation list 10. If there is a subsequent modification to a stripe that is on the recently modified list 12 and has not been error checking since the last modification, then the item may be removed from the recently modified list 12 on the assumption that the subsequent write results in an uncorrectable error.

In one embodiment, the storage manager 6 may process the entries in the recently modified list 8 to error check the stripes indicated in the most recently modified list to check those stripes most recently modified first. By performing error checking first on those stripes most recently modified, the storage manager 4 increases the likelihood that a block with an error will be detected before the error is propagated further, such as by using the incorrect checksum data in subsequent writes to recalculate one or more checksums for the stripe. As discussed the checksum data may not accurately reflect the data blocks in a stripe 14a, 14b, 14c, 14d if after the checksum was calculated, the data was not properly written to the storage units, e.g., "dropped write" or "off track write". If a checksum error is detected before the stripe is subsequently updated, then the storage manager 4 may determine the data block causing the error because only one block ($D_i$) was updated when the checksum was calculated. If multiple data blocks are updated and the wrong checksum recalculated, then the modified block resulting in the checksum error may not be discernible from the multiple modified blocks. There may be two different updates that occur before the checksum error is detected. One is a "full stride write" type update which removes the stripe from the "most recently updated state" because the checksum is recalculated using all the data blocks D1, D2 . . . $D_n$. A "full stride write" results in the stripe being removed from the recently modified list 12. During a "Read Modified Write" (RMW) update, only those data blocks that have changed are updated and the checksum is calculated from partial data blocks the stripe leaving the "most recently updated state". An RMW operation results in the addressable block for the stripe being added to the recently modified list 12. If the stripe is already indicated on the list 12, then the stripe 12 is removed from the recently modified list 12 because this subsequent update based on a partial checksum may result in error propagation and/or error hiding so the error checking operation may or may not find a problem In an embodiment where there are both vertical and horizontal checksum elements, as shown in FIG. 2, if a stripe has not been updated, then the data block $D_i$ with the error may be determined by checking the vertical checksum elements to determine the vertical column having a checksum error, indicating the data block that was not correctly written. However, propagating errors in two directions, horizontal and vertical checksum, multiple times may make it difficult or unfeasible to determine the disk ($D_i$) in which the error occurred. The schemes with vertical and horizontal checksum may be part of a RAID6 (a RAID with 2 checksums) architecture. When using horizontal and vertical topology, the second checksum does not have to comprise an RS polynomial sum and can instead be calculating using XOR checksum generation since there is only a single simple share by any code.

In an alternative embodiment, the storage manager 4 may immediately perform an error checking operation after writing the modified data and modified checksum for a stripe 14a, 14b, 14c, 14d by reading the just updated checksum and data, and recalculating the checksum data to check whether the modified data was written properly to storage 6.

Figure 4:
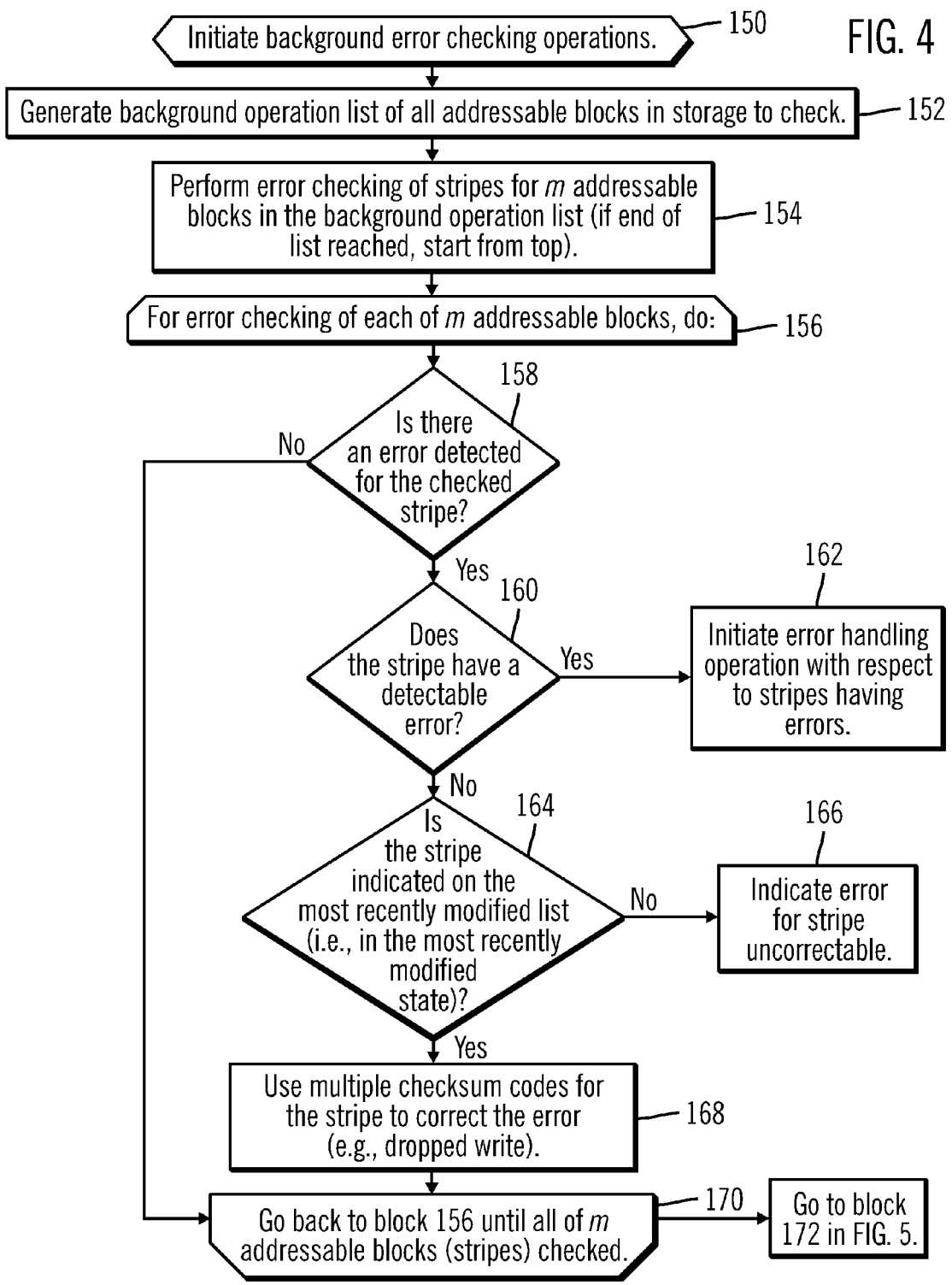
FIGS. 4 and 5 illustrate an embodiment of operations to check the checksum data in stripes for addressable blocks in storage.

FIG. 4 illustrates an embodiment of operations performed by the storage manager 4 for checking the one or more checksums for a stripe. Upon initiating (at block 150) error checking operations, the storage manager 4 generates (at block 152) a background operation list 10 of all addressable blocks in the storage 6 to check. The storage manager 4 performs (at block 154) error checking of stripes for m addressable blocks indicated in the background operation list 10 starting from the last accessed addressable block in the list. Error checking may involve the storage manager 4 reading all the data blocks $D_1$, $D_2 \ldots D_n$ for the checked stripe 14a, 14b, 14c, 14d, recalculating the one or more checksums, and comparing the recalculated checksum to the stored checksums, e.g., (P) and/or (Q), etc. If the recalculated and stored checksums (P) and/or (Q) for the stripe 14a, 14b, 14c, 14d match, then there is no checksum error; if they do not match, then the one or more stored checksums do not accurately reflect the stored data blocks.

The storage manager 4 performs a loop of operations at blocks 156 through 170 for each of the m addressable blocks in the background operation list 10 to process. If the end of the background operation list 10 is reached, then the storage manager 4 may return to accessing stripes for addressable blocks at the top of the background operation list 10. In one embodiment, the background operation list 10 may order addressable blocks according to their address number, from lowest address to highest. If (at block 158) there is a checksum error for any of the m checked stripes 14a, 14b, 14c, 14d and if (at block 160) the error is detectable, then the storage manager 4 initiates (at block 162) an error handling operation with respect to the checked stripe. A detectable error may comprise an error such that the location or block where the error occurred can be determined. An undetectable error may comprise a dropped write, where the location of the error cannot be determined because the data was not written to the location or because the error was propagated multiple times. The error handling at block 162 may involve attempting to use the one or more checksums for the stripe to recover the data in the block having the error or fencing off the block until the cause of the error can be detected and fixed.

If (at block 160) the error is determined to be undetectable, e.g., a dropped write, and the stripe having the checksum error is not indicated on the most recently modified list 12 (at block 164) (i.e., in the most recently modified state), then an indication is made (at block 166) that the error for the stripe cannot be corrected because the modified data may have been subsequently updated, decreasing the likelihood that the stripe can be recovered, or there may have been no update that could have resulted in an error. Otherwise, if (at block 164) the stripe having the undetectable error is indicated on the most recently modified list 12, then the storage manager 4 uses (at block 168) one or more checksum codes, e.g., (P) and/or (Q) as shown in FIG. 1 or vertical and horizontal parities as shown in FIG. 2, for the stripe to correct the error (e.g., dropped write).

Figure 5:
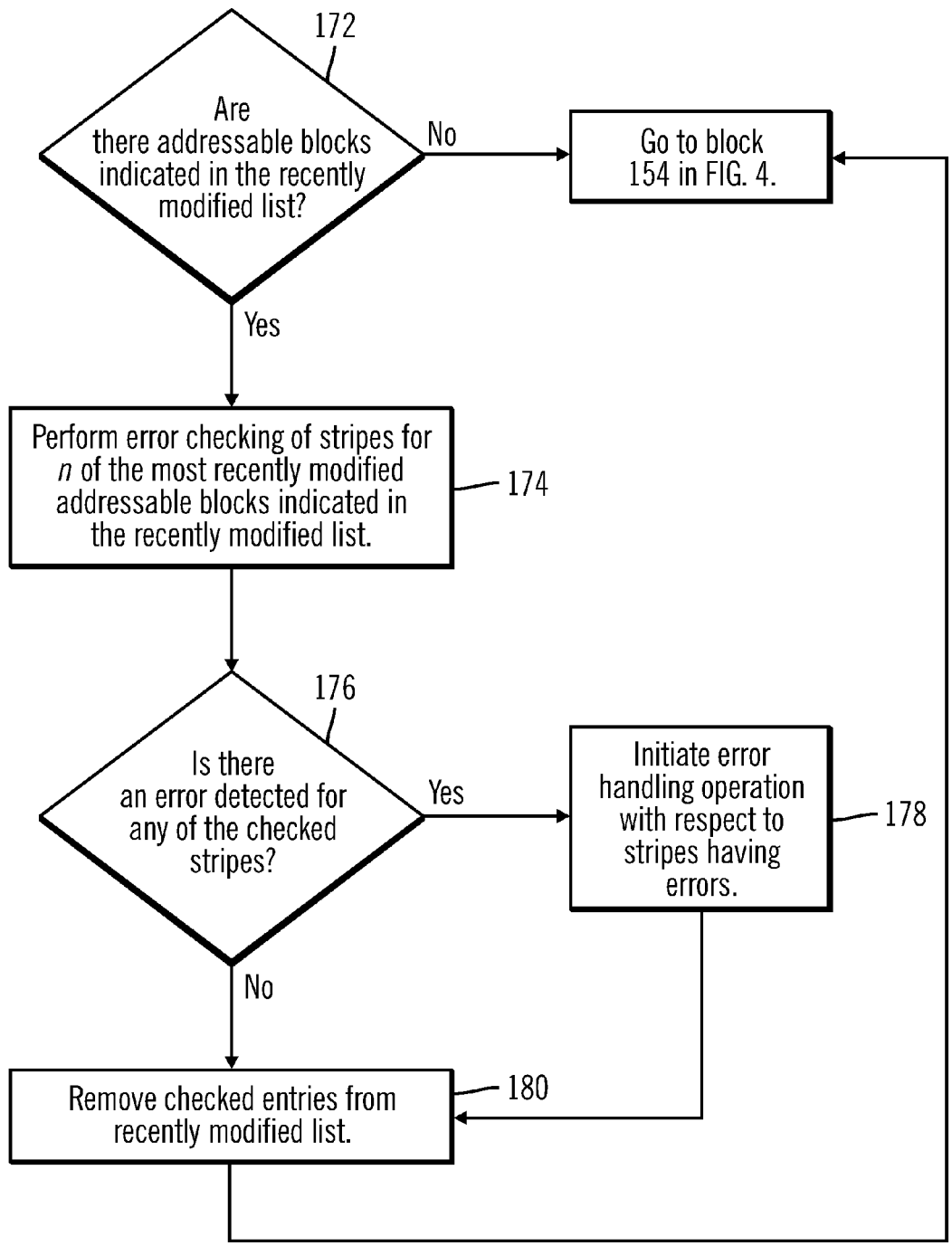

With respect to FIG. 5, after processing the m addressable blocks in the background operation list 10, the storage manager 4 determines (at block 172) whether there are addressable blocks indicated in the recently modified list 12. If so, then the storage manager 4 performs (at block 174) error checking of stripes for n of the most recently modified addressable blocks indicated in the recently modified list 12. If (at block 172) the recently modified list 12 is empty, then control proceeds back to block 154 in FIG. 4 to continue processing the background operation list 10. If (at block 176) there are checksum errors for any of the checked n stripes from the recently modified list 12, then the storage manager 4 initiates (at block 178) an error handling operation with respect to stripes having checksum errors. As discussed, the error handling operation may use one or multiple checksum blocks, e.g., checksums, to correct the error. If (at block 176) there was no error or after performing error handling (at block 178), the storage manager 4 removes (at block 180) the addressable blocks for the considered n stripes form the recently modified list 12 and returns to block 154 to continue processing the background operation list 10.

With the described operations of FIGS. 4 and 5, the storage manager 4 alternates between performing error checking of the stripes for addressable blocks indicated in the background operation list 10 and addressable blocks indicated in the recently modified list 12. In certain embodiments, the m addressable blocks checked in the background operation list 10 may exceed the n addressable blocks checked in the recently modified list 12. For instance, the storage manager 4 may error check the stripes for twelve addressable blocks in the background operation list 10 and then check the stripes for two addressable blocks in the recently modified list 12.

In the embodiments of FIGS. 4 and 5, the background operation list 10 is checked before the recently modified list 12. In an alternative embodiment, the recently modified list 12 may be checked for errors before checking the background operation list 10.

In certain embodiments, the storage manager 4 may use resources devoted to background operation error checking to perform both the recently modified list and background operation list error checking. In a further embodiment, the storage manager 4 may allocate additional resources to the error checking to improve the performance of error checking with respect to both lists 10 and 12, which may negatively impact general read/write processing.

With the described embodiments, the storage manager performs additional error checking of stripes for addressable blocks most recently modified to increase the likelihood of detecting a checksum error before the addressable block is subsequently updated and the checksum error propagated.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented as hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described operations of FIGS. 4 and 5, the storage manager performs error checking with respect to addressable blocks indicated in both a background operation list 10 and a recently modified list 12. In an alternative embodiment, the storage manager may not perform a background error check of all the addressable blocks and may only error check modified addressable blocks indicated in the recently modified list 12. Alternatively, the storage manager may not use a list 12, and may immediately error check an addressable block after updating the checksum and data for an addressable block.

In the described embodiments, RAID algorithms are used to write user data and checksum data to storage. In an alternative embodiment, different storage algorithms may be used to write user and checksum data to storage in different arrangements than shown in FIGS. 1 and 2.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a non-transitory computer readable storage medium having code executed to cause operations with respect to a storage device and a memory and to cause operations comprising:

storing addressable blocks of data in the storage device in stripes, wherein each stripe includes a plurality of data blocks for one of the addressable blocks and at least one checksum block including checksum data derived from the data blocks for the addressable block;

receiving a write request to modify data in one of the addressable blocks in the storage device;

performing a write for the write request to modify one of the addressable blocks to generate a modified addressable block and updating the checksum data in the stripe having the modified addressable block to generate an updated checksum, wherein modified data in the modified addressable block and the updated checksum data resulting from the write are destaged to the storage device;

indicating in a recently modified list in the memory the modified addressable block;

after the write is performed, performing an error checking operation on a plurality of the stripes having modified addressable blocks indicated in the recently modified list by reading the data blocks and the checksum data in the plurality of the stripes having the modified addressable blocks to determine if the checksum data is accurate; and initiating an error handling operation in response to determining that the checksum data is not accurate.

2. The article of manufacture of claim 1, wherein the operations further comprise:

recalculating the checksum data in the stripe as part of the error checking operation or a write during which the at least one checksum block is recalculated using all the data blocks in the stripe; and removing the modified addressable block indicated in the recently modified list in response to recalculating the checksum data using all the data blocks in the stripe for the modified addressable block.

3. The article of manufacture of claim 1, wherein the operations further comprise:

initiating a background operation to read the data blocks and the at least one checksum block in each stripe for a plurality of addressable blocks to determine if the checksum data is accurate, wherein the plurality of addressable blocks on which to perform the background operation includes modified and unmodified data.

4. The article of manufacture of claim 1, wherein the operations further comprise:

initiating a background operation to determine if the checksum data is accurate.

5. The article of manufacture of claim 4, wherein the operations further comprise:

alternating between processing m stripes as part of the background operation and n stripes as part of the error checking operation processing the modified addressable blocks indicated in the recently modified list, wherein m is greater than n.

6. The article of manufacture of claim 1, wherein the data and checksum blocks in one stripe are written to different storage devices according to a Redundant Array of Independent Disk (RAID) algorithm.

7. A system in communication with a storage device, comprising:

a memory;

storage manager code enabled to cause operations, the operations comprising:

storing addressable blocks of data in the storage device in stripes, wherein each stripe includes a plurality of data blocks for one of the addressable blocks and at least one checksum block including checksum data derived from the data blocks for the addressable block;

receiving a write request to modify data in one of the addressable blocks in the storage device;

performing a write for the write request to modify one of the addressable blocks to generate a modified addressable block and updating the checksum data in the stripe having the modified addressable block to generate an updated checksum, wherein modified data in the modified addressable block and the updated checksum data resulting from the write are destaged to the storage device;

indicating in a recently modified list in the memory the modified addressable block;

after the write is performed, performing an error checking operation on a plurality of the stripes having modified addressable blocks indicated in the recently modified list by reading the data blocks and the checksum data in the plurality of the stripes having the modified addressable blocks to determine if the checksum data is accurate; and initiating an error handling operation in response to determining that the checksum data is not accurate.

8. The system of claim 7, wherein the operations further comprise:

recalculating the checksum data in the stripe as part of the error checking operation or a write during which the at least one checksum block is recalculated using all the data blocks in the stripe; and removing the modified addressable block indicated in the recently modified list in response to recalculating the checksum data using all the data blocks in the stripe for the modified addressable block.

9. The system of claim 7, wherein the operations further comprise:

initiating a background operation to read the data blocks and the at least one checksum block in each stripe for a plurality of addressable blocks to determine if the checksum data is accurate, wherein the plurality of addressable blocks on which to perform the background operation includes modified and unmodified data.

10. The system of claim 7, wherein the operations further comprise:

initiating a background operation to determine if the checksum data is accurate.

11. The system of claim 10, wherein the operations further comprise:

alternating between processing m stripes as part of the background operation and n stripes as part of the error checking operation processing the modified addressable blocks indicated in the recently modified list, wherein m is greater than n.

12. The system of claim 7, wherein the data and checksum blocks in one stripe are written to different storage devices according to a Redundant Array of Independent Disk (RAID) algorithm.

13. A method, comprising:

storing addressable blocks of data in a storage device in stripes, wherein each stripe includes a plurality of data blocks for one of the addressable blocks and at least one checksum block including checksum data derived from the data blocks for the addressable block;

receiving a write request to modify data in one of the addressable blocks in the storage device;

performing a write for the write request to modify one of the addressable blocks to generate a modified addressable block and updating the checksum data in the stripe having the modified addressable block to generate an updated checksum, wherein modified data in the modified addressable block and the updated checksum data resulting from the write are destaged to the storage device;

indicating in a recently modified list in the memory the modified addressable block;

after the write is performed, performing an error checking operation on a plurality of the stripes having modified addressable blocks indicated in the recently modified list by reading the data blocks and the checksum data in the plurality of the stripes having the modified addressable blocks to determine if the checksum data is accurate; and initiating an error handling operation in response to determining that the checksum data is not accurate.

14. The method of claim 13, further comprising:

recalculating the checksum data in the stripe as part of the error checking operation or a write during which the at least one checksum block is recalculated using all the data blocks in the stripe; and removing the modified addressable block indicated in the recently modified list in response to recalculating the checksum data using all the data blocks in the stripe.

15. The method of claim 13, further comprising initiating a background operation to read the data blocks and the at least one checksum block in each stripe for a plurality of addressable blocks to determine if the checksum data is accurate, wherein the plurality of addressable blocks on which to perform the background operation includes modified and unmodified data.

16. The method of claim 13, further comprising:

initiating a background operation to determine if the checksum data is accurate.

17. The method of claim 16, further comprising:

alternating between processing m stripes as part of the background operation and n stripes as part of the error checking operation processing the modified addressable blocks indicated in the recently modified list, wherein m is greater than n.

18. The method of claim 13, wherein the data and checksum blocks in one stripe are written to different storage devices according to a Redundant Array of Independent Disk (RAID) algorithm.

* * * * *